(12) United States Patent
Cudak et al.

(10) Patent No.: US 7,640,373 B2
(45) Date of Patent: Dec. 29, 2009

(54) METHOD AND APPARATUS FOR CHANNEL QUALITY FEEDBACK WITHIN A COMMUNICATION SYSTEM

(75) Inventors: Mark C. Cudak, McHenry, IL (US); Brian K. Classon, Palatine, IL (US); Anup Talukdar, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 342 days.

(21) Appl. No.: 10/423,243

(22) Filed: Apr. 25, 2003

(65) Prior Publication Data

US 2005/0289256 A1   Dec. 29, 2005

(51) Int. Cl.
G06F 3/00 (2006.01)
G06F 13/00 (2006.01)

(52) U.S. Cl. ............................. 710/19; 710/33; 710/52; 455/70

(58) Field of Classification Search ................... 445/70; 710/19, 33, 52
See application file for complete search history.

(56) References Cited

U.S. PATENT DOCUMENTS

| | | | | |
|---|---|---|---|---|
| 7,133,399 | B1* | 11/2006 | Brewer et al. ............... | 370/360 |
| 2001/0007574 | A1* | 7/2001 | Liu et al. .................... | 375/219 |
| 2001/0010684 | A1* | 8/2001 | Willenegger et al. ........ | 370/311 |
| 2002/0110088 | A1* | 8/2002 | Lundby et al. .............. | 370/252 |
| 2002/0136162 | A1* | 9/2002 | Yoshimura et al. .......... | 370/229 |
| 2002/0172205 | A1* | 11/2002 | Tagore-Brage et al. . | 370/395.42 |
| 2003/0073409 | A1* | 4/2003 | Nobukiyo et al. .......... | 455/67.1 |
| 2003/0112778 | A1* | 6/2003 | Lundby ...................... | 370/335 |
| 2003/0157953 | A1 | 8/2003 | Das et al. | |
| 2003/0161285 | A1* | 8/2003 | Tiedemann et al. ......... | 370/332 |
| 2004/0006732 | A1* | 1/2004 | Lundby ...................... | 714/748 |
| 2004/0166869 | A1 | 8/2004 | Laroia et al. | |
| 2004/0179493 | A1 | 9/2004 | Khan | |

(Continued)

FOREIGN PATENT DOCUMENTS

EP   1411647 A   4/2004

(Continued)

OTHER PUBLICATIONS

Shin-Yokohama, Samsung Electronics Co. "Gated Transmission of DPCCH in DCH/DCH Control Only Substrates". Japan, Apr. 18-20, 1999.

(Continued)

*Primary Examiner*—Tariq R. Hafiz
*Assistant Examiner*—Scott Sun
(74) *Attorney, Agent, or Firm*—Kenneth A. Haas; Steven A. May (57) ABSTRACT

A base station (101) will request the transmission of quality information from a particular remote stations (102, 103) only when data is queued to be transmitted to the remote stations. Once a remote station begins the transmission of channel quality information, the transmission of such information continues until the data transmission is successfully delivered to the remote station. The base station receives the channel quality information and adjusts the modulation and coding of the remote stations accordingly. Where data is transmitted simultaneously to a plurality of remote stations, a set of queues (303) for the multiple remote stations is maintained, and based on queue status, a channel quality request messages is sent to a sub-set of remote stations with data queued.

32 Claims, 5 Drawing Sheets

U.S. PATENT DOCUMENTS

2004/0203455 A1 * 10/2004 Bao et al. ................ 455/67.13

FOREIGN PATENT DOCUMENTS

| JP | 2003-009247 A | 10/2003 |
| KR | 20020046351 | 6/2002 |
| WO | 0231991 A | 4/2002 |
| WO | 03049353 A | 6/2003 |

OTHER PUBLICATIONS

3GPP TSG RAN WG1 31: "Tdoc R1-03-0286 Text proposal on CGI Enhancements for TR on HSDPA Enhancements", TSG-RAN WG1 #31, Feb. 18, 2003, pp. 1-7.

* cited by examiner

FIG. 1

| PARAMETER | VALUE |
|---|---|
| USER IDENTITY | 12 |
| TIMING ADVANCE | 1 |
| PERSISTENCE | 1 |
| TIMEOUT | 2 |
| RESOURCE ALLOCATION | 7 |
| CRC (BEYOND USER ID) | 8 |
| TAIL | 8 |
| TOTAL | 39 |

METHOD AND APPARATUS FOR CHANNEL QUALITY FEEDBACK WITHIN A COMMUNICATION SYSTEM

FIELD OF THE INVENTION

The present invention relates generally to communication systems and in particular, to a method and apparatus for channel quality feedback within a communication system.

BACKGROUND OF THE INVENTION

Next-generation communication system standards use fast adaptive modulation and coding (AMC) combined with multi-user diversity scheduling to provide system capacity improvements for packet data applications. Such systems typically use some form of channel quality feedback that briefs the scheduler with regards to the channel conditions of each mobile. The scheduler uses the feedback to identify which users are in a constructive fade and then to select the appropriate modulation and coding rate based on the reported channel conditions. The feedback is designed to track fading for low mobility (e.g. 3-30 kmph). In a communication system employing the 1xEV-DO system protocol, the feedback rate is 2.4 kbps; a 4-bit channel quality report is sent back every 1.67 ms.

Such communication systems typically utilize a dedicated control channel that is established for the duration of a packet call, and the channel quality feedback is transmitted as part of the dedicated control channel. The dedicated control channel is typically activated when a user requests a web page and de-activated after a period of inactivity by a pre-defined inactivity timer. Current implementations set the inactivity timers as high as 60 seconds, but in the future it may be set as low as 2-to-5 seconds. Even with the lower numbers, ten to one hundred users may be simultaneously maintaining a dedicated control channel depending on the packet data application being used. Because of this, the aggregate rate of all the feedback channels can be as high as 240 kbps. Furthermore, since significant gaps between packets exist (e.g. 200 ms) due to the packet inter-arrival process within a packet call, most of the mobiles do not have a single packet queued while they are providing this channel quality feedback. Thus, the majority of the feedback is unnecessary and wastes uplink resources.

The problem of wasted uplink resources will be exacerbated in future systems, which may require additional feedback in order to communicate the status of frequency selective channels and multiple spatial paths. Therefore, a need exists for a method and apparatus for providing channel quality feedback within a communication system that does not provide unnecessary feedback, wasting uplink resources.

DETAILED DESCRIPTION OF THE DRAWINGS

To address the above-mentioned need, a method and apparatus for providing channel-quality feedback is provided herein. In accordance with the preferred embodiment of the present invention, a base station will request the transmission of quality information from a particular remote stations only when data is queued to be transmitted to the remote stations. Once a remote station begins the transmission of channel quality information, the transmission of such information continues until the data transmission is successfully delivered to the remote station. The base station receives the channel quality information and adjusts the modulation and coding of the remote stations accordingly. Where data is transmitted simultaneously to a plurality of remote stations, a set of queues for the multiple remote stations is maintained, and based on queue status, a channel quality request messages is sent to a sub-set of remote stations with data queued.

The present invention encompasses a method comprising the steps of determining if data is queued to be sent to a remote station, and based on whether or not data is queued, transmitting a channel quality request message to the remote station, causing the remote station to transmit a channel quality report indicating a perceived channel quality.

The present invention additionally encompasses a method comprising the steps of receiving a channel quality request message from a base station and in response to the channel quality request message, transmitting a channel quality report message to the base station indicating a perceived channel quality, The channel quality report messages are transmitted to the base station until a data packet is successfully received from the base station.

The present invention additionally encompasses a method comprising the steps of determining that data is queued for a plurality of remote stations, transmitting a plurality of channel quality request reports to a first subset of the plurality of remote stations causing the first subset of the plurality of remote stations to transmit a plurality of channel quality reports indicating a perceived channel quality, and based on the plurality of channel quality reports, transmitting queued data to a second subset of the plurality of remote stations.

The present invention additionally encompasses an apparatus comprising a plurality of data queues, logic circuitry determining remote units that have data queued within the plurality of data queues, and a transmitter, transmitting a channel quality request message to the remote station in response to the logic circuitry determining that data is queued for the remote unit, the channel quality request message causing the remote station to transmit a channel quality report indicating a perceived channel quality.

Figure 1:
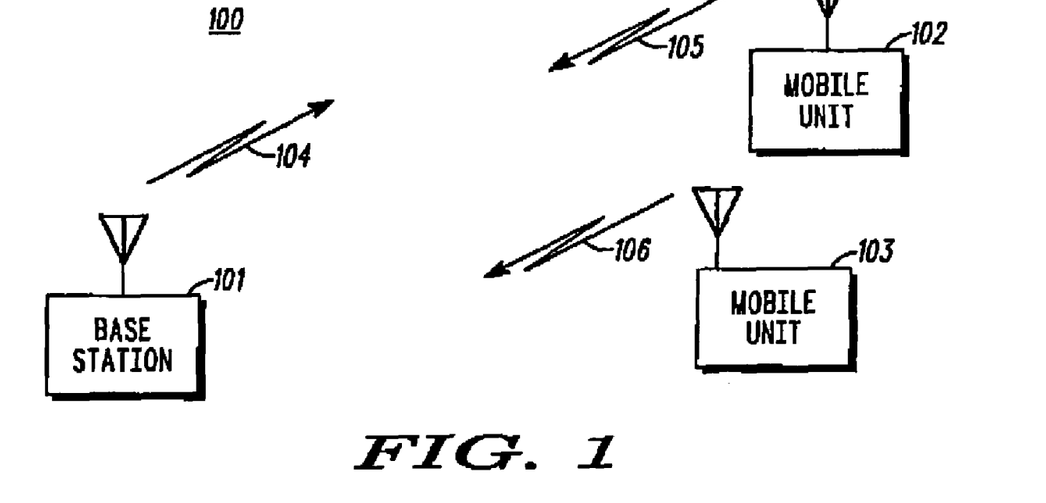
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention communication system 100 utilizes a next-generation communication system protocol such as, but not limited to the IEEE 802.20 or a $4^{th}$ generation communication system protocol. As shown, communication system 100 comprises base station 101 and mobile, (or remote stations) 102 and 103. For simplicity, communication system 100 is shown with two remote stations 102 and 103, but one of ordinary skill in the art will recognize that communication system 100 typically comprises many more remote stations in communication with base station 101. Base station 101 is communicating to remote stations 102 and 103 via downlink communication signal 104, while remote stations 102 and 103 are communicating to base station 101 via uplink communication signals 105 and 106, respectively.

During operation base station 101 may receive channel quality feedback from each mobile. Base station 101 may use this information to select a subset of mobiles with the best channel conditions and adaptively modify a modulation and coding (AMC) for those mobiles in communication with base station 101. More particularly, with stream-level AMC, the modulation and coding format of a data stream is changed to match the current received signal quality ($S/(I+N)$). In a system with AMC along with multi-stream transmission, streams with high $S/(I+N)$ are typically assigned higher-order modulations rates (e.g., 64-QAM), with the modulation-order and/or the code rate decreasing as $S/(I+N)$ decreases. Each downlink stream is modulated utilizing a modulation scheme that is dependent upon the received signal quality for the stream. For those receivers experiencing high signal-to-noise, modulation schemes such as 16 QAM 64 QAM 256 QAM are utilized, while for those receivers experiencing low signal-to-noise, modulation schemes such as QPSK and BPSK are utilized.

As discussed, the aggregate rate of the channel quality feedback from all the remote stations can be very high. Furthermore, since significant gaps between packets exist due to the packet inter-arrival process within a packet call, most of the remote stations do not have a single packet queued while they are providing this channel quality feedback. Thus, the majority of the feedback is unnecessary and wastes uplink resources. In order to address this issue, in the preferred embodiment of the present invention channel quality reporting is performed by all remote stations within communication system 100 only when requested by base station 101.

Typically, base station 101 will request channel quality information from a particular remote station only when data is queued to be transmitted to the remote station, and based off the received information, base station 101 will determine appropriate AMC parameters for transmission. In general, the base station 101 may request channel quality from a first subset of remote stations in communication with base station 101 that have data queued. Base station 101 may then select a second subset of remote units to receive data transmissions. This second subset may be based on a variety of factors such as best channel quality condition, the highest priority data or service guarantees (e.g. fairness). Alternatively, the selection criteria may be based on a weighted combination of the above-mentioned factors. The AMC parameters for these data transmissions are then based on the received channel quality information. In a first embodiment of the present invention, channel quality reporting continues by the remote station until the next data packet is successfully received from the base station. However, in alternate embodiments, different reporting schemes may be utilized. For example, in a second embodiment, the channel quality reporting continues by the remote station until no data remains queued to be transmitted to that remote station at the base station. The remote unit knows that there is no remaining data queued when it successfully receives a data packet associated with an indicator that a channel quality report message is no longer required. The indicator is typically the queue status transmitted as a last packet indicator. In a third embodiment, the channel quality reporting continues by the remote station for a predetermined period of time.

Channel Quality Report Message:

In various embodiments of the present invention the channel quality report message may take one of several predefined formats. For example:

The channel quality report message may contain a single channel quality value;

the channel quality report message may contain spatial channel information;

the channel quality report message may contain multiple channel quality values, where each value may be tied to a different frequency domain support;

the channel quality report may contain a channel sounding waveform;

the channel quality report message may contain additional information to help the transmitter schedule a transmission, such as a mobile speed indicator, or spatial channel quality indicator;

the channel quality report message may be broken down by QoS classification of individual data flows; or the channel quality report message may contain the status of the queue state at the receiver.

Various techniques for reporting the channel quality include, but are not limited to:

sending a number (e.g., two) of channel quality report messages in response to a channel quality request message;

sending channel quality report messages until a transmission is successful in response to a channel quality request message;

sending channel quality report messages until a transmission is aborted in response to a channel quality request message;

sending channel quality report messages until a timer expires in response to a channel quality request message. The timer may be predefined or the timer value may be set within the channel quality request message; or sending channel quality report messages until the transmitter data queue is empty in response to a channel quality request message. The receiver may determine that the data queue is non-empty by the presence of additional transmissions directed to the receiver or may look for additional transmissions until a timer expires, where the timer value may be pre-defined or transmitted to the receiver. Additionally the receiver may determine that the data queue is non-empty by examining a non-empty indicator within a transmission control channel or by examining a non-empty indicator within a successfully decoded transmission. Ideally, the queue empty indication would be transmitted simultaneously with the last packet in the queue. Therefore, the queue empty indication could be used to indicate that this is the last packet in the queue rather than literally indicating that the queue is already empty. Logically, the queue will become empty once the last packet has been successfully transmitted.

Channel quality report contents can be quantized channel quality information (such as C/I), or a data rate request, received-signal-strength indicator, modulation and coding rate, modulation and coding scheme index, or the like. In a preferred embodiment, the receiver chooses between two different formats based on vehicle speed and observed frequency selectivity of the channel. Each format can be sent at a different transmit power level. In a preferred embodiment (where the receiver selects the format) the transmitter that receives the channel quality report message can blindly decode the resource assignment and determine which format the receiver used. The resources used for the transmission can be different sizes for each message. The resource sizes may be the same, perhaps to facilitate blind decoding at the transmitter. In a preferred embodiment, all formats use an Interleaved Frequency Division Multiple Access (IFDMA) uplink (with a fixed Repetition Factor (RPF) for that uplink/downlink split), QPSK modulation, a lowest RPF of 32 to 128 with a fixed 192 bit payload. A CRC is added for reliability.

The channel quality report message may contain a single channel quality value. A format with a single measurement is often an average value across the frequency band. It is possible that a single value may have fewer information bits in the message, and can be sent with lower power and achieve the same reliability and lower system interference. In a preferred embodiment, a first format, denoted "Average C/I measurement", contains a non-frequency selective measurement of the channel. It may contain the average channel condition quantized to, for example, 8 bits. This format may be used for high Doppler (velocity) conditions when the channel cannot be accurately tracked over time, when there is too much frequency selectivity in the channel, or when extra frequency selective information would not be useful (flat single path channel).

The channel quality report message may contain multiple channel quality values. In a preferred embodiment, each value may be tied to a different frequency domain support. A second format, denoted "Frequency selective measurement", is required for frequency selective (DSL-like) scheduling/coding method, as known in the art. This method can advantageously improve throughput to a lower velocity (Doppler) user without excessive frequency selectivity in the channel. The format contains a full frequency domain report of the downlink quality. For example, in an Orthogonal Frequency Division Multiplexed (OFDM) downlink with 768 subcarriers, one 2-bit desired modulation level for each group of 16 subcarriers can be sent (96 bits total). Other methods of source coding (run length coding, etc.) the frequency selective information are also possible, and could allow more bits (say 3 to 4) per frequency bin.

The channel quality report message may contain spatial channel information. In an alternate embodiment, there may be a third format defined to provide both frequency and spatial information across the band, such as could be used for a closed-loop multiple antenna system.

The channel quality report may be a channel sounding waveform. The channel sounding waveform is a known waveform received by the transmitter and used to estimate the channel at the transmitter. This method of channel estimation may be useful for both downlink and uplink transmissions in a Time Division Duplex (TDD) system.

The channel quality report message may also contain additional information to help the transmitter schedule a transmission or the next channel quality request, such as a mobile speed indicator, spatial channel quality indicator, multi-path delay spread detector, etc. A spatial channel quality indicator may be a condition number or reciprocal condition number. The additional information would help the transmitter determine when it is appropriate to schedule the next channel quality request/report. For example, if the receiver reports an instantaneous channel quality that is far below the average for a low vehicular speed, the base may wait many frames before requesting additional feedback. Alternatively, if a mobile reports high vehicular speed, the base may dispense with additional feedback prior to scheduling a downlink transmission since it is difficult to track the fast fading.

Figure 2:
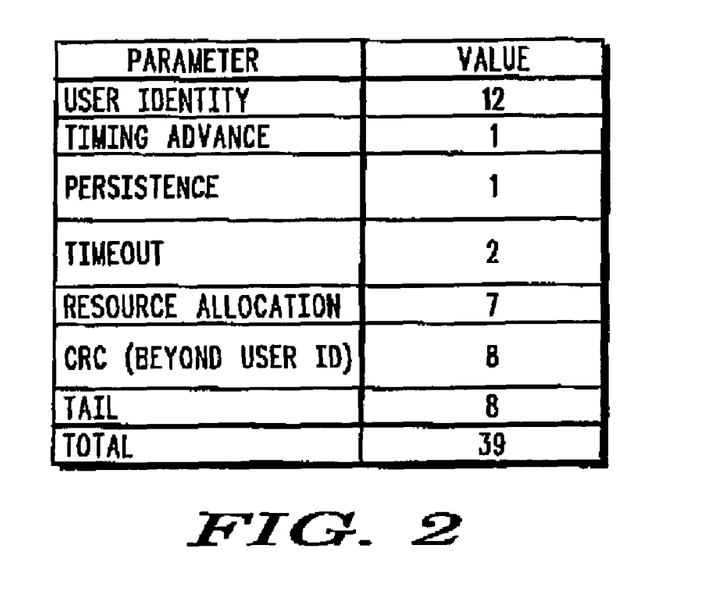
FIG. 2 illustrates a channel quality request message in accordance with the preferred embodiment of the present invention.

Channel Quality Request Message:

The channel quality request message can be transmitted as known in the art. In the preferred embodiment of the present invention the message is of a format shown in FIG. 2, and contains 39 information bits. Additionally, is R=0.81 coded to 48 coded bits via a 256 state convolutional code, and is modulated onto 24 QPSK symbols and is transmitted on subcarriers within an OFDM system with a 2.5 ms frame duration. In an alternate embodiment, the method could use different or no coding, a different modulation, and could be transmitted within a CDMA, TDMA, or other system, as is known in the art. The 39 information bits within the channel quality request message are as follows:

USER IDENTITY—identifies the receiver;

TIMING ADVANCE—indicates that the receiver should initiate a timing advance update procedure. The timing advance procedure can be any procedure known in the art. For example, the receiver could send a timing advance burst and then receive a timing advance update from the transmitter, possibly a 4-bit value of the timing advance in microseconds;

PERSISTENCE—indicates whether more than one channel quality report message should be sent in response to the channel quality request message;

TIMEOUT—indicates the maximum number of channel quality report messages to be sent after a channel quality request (typically 2, 4, 8, or 16, measured from the last successful packet transfer);

RESOURCE ALLOCATION—indicates which receiver to transmitter link resources should be used for the channel quality report message;

CRC—(beyond the user ID) plus the number of bits in 'User ID' is used for cyclic redundancy check to be used to ensure message integrity; and TAIL BITS—are used within the error correction encoder/decoder.

In a first embodiment, the base station sends the PERSISTENCE field to instruct the remote station to continue transmission of channel quality reports until a downlink packet is delivered successfully. The base station learns of the successful delivery by receiving the acknowledgment from the remote station. In the second embodiment, the PERSISTENCE field instructs the remote station to continue transmission of channel quality reports until the base station's associated remote-unit specific queue is empty. The remote station will learn the queue is empty by receiving a last-packet indication with the data transmission or control data associated with the data transmission. Once the last-packet is received successfully and acknowledged (e.g. acknowledgement was sent or negative acknowledgement was not sent), the remote station assumes that the base station's associated remote station specific queue is empty.

It is possible to combine the first and third embodiments such that the TIMEOUT field is used in conjunction with the PERSISTENCE field to provide alternative criteria for the remote station to stop the transmission of channel quality reports. For example if the TIMEOUT field is set to N, the remote station would continue channel quality reports for no more than N repetitions as in a third embodiment. Consistent with the previous description, a remote station will discontinue channel quality reports when a downlink packet is delivered before the timeout expires.

It is also possible to combine the second and third embodiments such that the PERSISTENCE field instructs the remote station to continue transmission until the base station's associated remote-unit specific queue is empty. In this case, an intermediate indication may be used to reset the channel quality report timeout. For example, each downlink transmission with the last packet field set to false could be used to reset the channel quality report timeout.

Thus, in accordance with the preferred embodiment of the present invention mobile, or remote stations within communication system 100 will not transmit channel quality information unless specifically requested to do so by base station 101. Base station 101 will request the transmission of quality information from a particular remote station only when data is queued to be transmitted to the remote station. Once a remote station begins the transmission of channel quality information, the transmission of such information continues until the data transmission is successfully delivered to the remote station. Base station 101 receives the channel quality information and determines the modulation and coding scheme accordingly.

Thus, in a communication system where data is transmitted to a plurality of remote stations, a set of queues for the multiple remote stations is maintained, and based on queue status, channel quality request messages are sent to a first subset of remote stations with data queued. This first subset could simply be all remote stations with data queued or it can be reduced based on other information, such as the priority associated with the remote stations, channel quality trends determined from past channel quality reports, vehicular speed (e.g. slow, medium, fast) or service guarantees. The other information may also include knowledge that the base station can only process a maximum number of requests/report messages per frame, or that the base station does not want to get in more messages than can be reasonably scheduled. The base station may also want channel quality report messages coming in more of a pipelined fashion, especially with embodiments where multiple channel quality messages may be sent in response to a single channel quality request message.

The base station then receives channel quality reports back from the first subset of remote stations indicating a perceived channel quality. Based on the received channel quality reports and other information, the base selects a second subset of remote stations for data transmission. Similar to the selection of the first subset, the other information used for the second subset may include channel quality trends determined from past channel quality reports, vehicular speed or service guarantees. The other information also contains continuing channel quality reports from remote stations that had earlier received a channel quality request.

When selecting and transmitting to the second subset of remote stations, the base station may determine, based on received channel quality reports and other information, a modulation and coding scheme for each of the remote stations. For remote stations that are not selected to be in the second subset, this modulation and coding scheme would be representative of a modulation and coding scheme that could have been used if that remote unit had been selected. For remote units within the second subset, the queued data is transmitted utilizing the determined modulation and coding scheme. In all cases, a modulation and coding scheme may comprise one or more modulation and coding levels. More than one modulation and coding level may be appropriate when the channel quality report message indicates a modulation level for each of a plurality of sub-bands, as might be sent in a "Frequency selective measurement."

Figure 3:
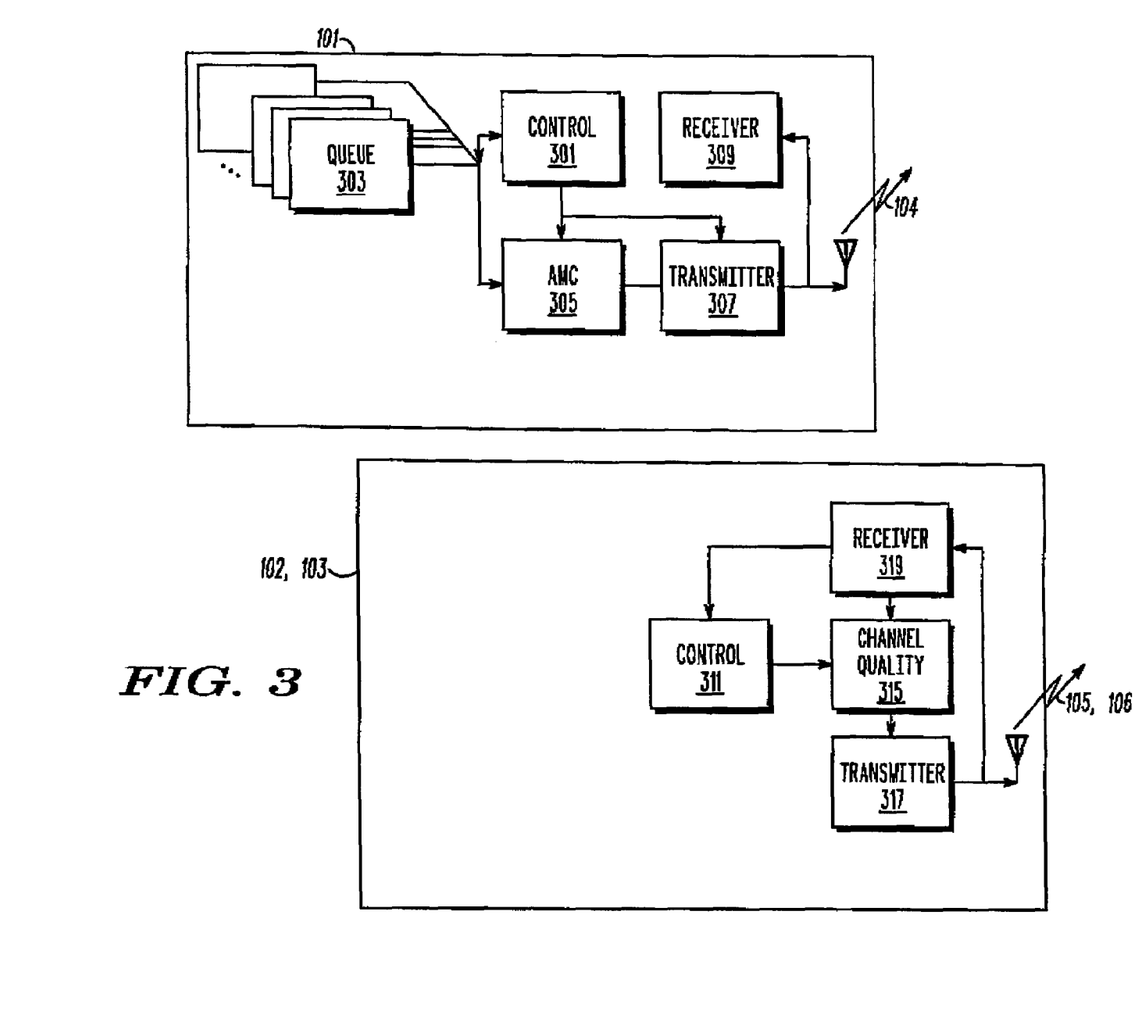
FIG. 3 is a block diagram of a base station and remote station in accordance with the preferred embodiment of the present invention.

FIG. 3 is a block diagram of base station 101 along with a mobile, or remote station 102, 103 in accordance with the preferred embodiment of the present invention. As shown, base station 101 comprises control circuitry 301, a plurality of remote station specific data queues 303, Adaptive Modulation and Coding (AMC) circuitry 305, transmitter 307, and receiver 309. Control circuitry 301 is preferably a microprocessor controller such as, but not limited to a Motorola PowerPC. Receiver 309 and transmitter 307 are preferably standard transmission and reception circuitry that utilizes one of several well known transmission/reception protocols such as, but not limited to IFDMA and OFDM. Finally, AMC circuitry 305 performs modulation and coding of data, changing the modulation and coding to match the current received signal quality. Each of the remote station specific queues 303 will buffer data for a respective remote-unit within the system. The control circuitry 301 is coupled to the remote station specific queues 303 so as to learn of the status of these queues being empty or full. Additionally, control circuitry 301 is coupled to receiver 309 in order to receive channel quality reports and downlink acknowledgements, while control circuitry 301 transmits channel quality requests via transmitter 307. Control circuitry 301 additionally is coupled to AMC circuitry 305 in order to identify which remote stations will receive data in the current frame and forward channel quality reports. AMC circuitry 305 is coupled to the remote specific data queues 303 in order to retrieve packets for transmissions. Finally, AMC circuitry 305 is coupled to transmitter 307 to transmit formatted data frames.

In a similar manner, the remote station 102, 103 comprises control circuitry 311, data queues 313, transmitter 317, and receiver 319. Control circuitry 311 is preferably a microprocessor controller such as, but not limited to an ARM processor. Receiver 319 and transmitter 317 are preferably standard transmission and reception circuitry that utilizes one of several well known transmission/reception protocols such as, but not limited to IFDMA and OFDM. Channel quality circuitry 315 is used to measure the channel quality and may be as simple as a receive signal strength indicator. Alternatively, the channel quality circuitry may be integrated with receiver and report on metrics associated with the demodulation process as is known by those skilled in the art. Control circuitry 311 is coupled with receiver 319 in order receive channel quality requests and downlink data packets. Control circuitry 311 is coupled with channel quality measurement circuitry 315 in order to measure the channel quality; and coupled to transmitter 317 in order to send channel quality reports and acknowledgements. Channel quality measurement circuitry 315 will be coupled to the antenna to measure the quality of the channel. Operation of base station 101 and remote station 102, 103 in accordance with the preferred embodiment of the present invention occurs as shown in FIG. 4 and FIG. 5, respectively.

Figure 4:
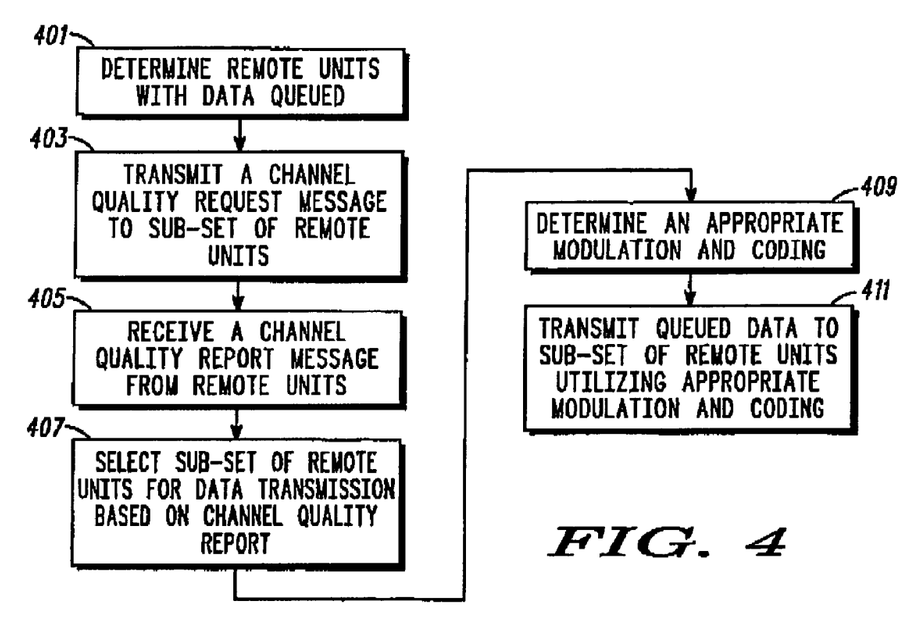
FIG. 4 is a flow chart showing operation of the base station of FIG. 1.
Figure 5:
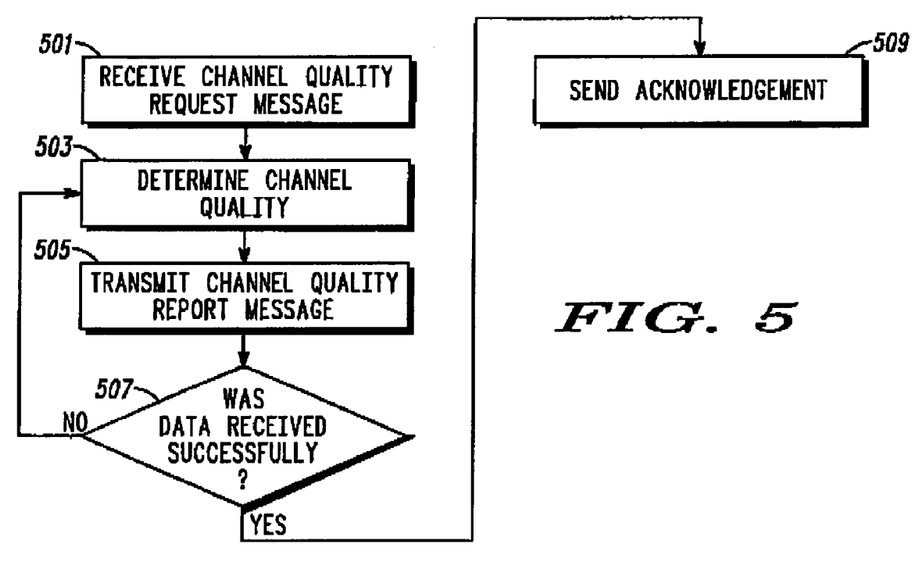
FIG. 5 is a flow chart showing operation of a remote station of FIG. 1

FIG. 4 is a flow chart illustrating operation of base station 101 without timing advance in accordance with the preferred embodiment of the present invention. The logic flow begins at step 401 where control circuitry 301 determines which remote stations have data queued in their associated remote station specific queues 303. At step 403 control circuitry 301 instructs transmitter 307 to transmit a channel quality request message to a first subset of the remote stations. The first subset of remote stations may simply be all remote stations with data queued. However, this first subset should be reduced to exclude all remote-units that are known to be persistently transmitting channel quality reports in response to previous channel quality requests to which data transmission has not been completed. Alternatively, the first subset may be further reduced based on a variety of other factors including trends determined from past channel quality reports, vehicular speed or service guarantees.

In response to the channel quality request message, receiver 309 receives a plurality of channel quality report messages from the remote stations (step 405). Note that some of these channel quality reports may represent persistent transmissions that have been solicited during previous frames. As discussed above, the channel quality report messages contain an indication of the perceived channel quality experienced by the remote stations. Based on the channel quality, control circuitry 301 determines a second subset of remote stations for data transmission. This second subset may be those remote stations who have the best channel conditions, the highest priority, or predetermined service guarantees. Furthermore, this second subset may be determined by a weighted function of all factors. For those remote stations, control circuitry 301 determines an appropriate modulation and coding scheme to utilize when transmitting the data to the remote stations (step 409). Note that steps 409 and 407 may be combined so that the AMC level is determined prior to or in conjunction with the selection of the second subset. In fact, the AMC level influences the quantity of resources (e.g. transmit power and number of symbols) required to communicate the queued data and therefore may limit the size of subset once all available resources are exhausted. Finally, at step 411, the queued data is transmitted to the second subset of the plurality of remote stations utilizing the appropriate modulation and coding.

In the preferred embodiment of the present invention the second subset of remote stations to have their data transmitted is chosen based on the remote stations' perceived channel condition. More particularly, those remote stations having good perceived channel conditions will have data transmitted to them, while remote stations (if any) perceiving poor channel conditions will not have data transmitted to them. At a later point in time, logic circuitry will repeat the above steps. In many cases the remote stations perceiving poor channel conditions will experience better channel conditions and have their data transmitted to them. Alternatively, the second subset may be those remote stations who have the highest priority or predetermined service guarantees. Furthermore, this second subset may be determined by a weighted function of all factors.

As discussed above, in a second embodiment, base station 101 may embed the queue status information with data transmissions. This comprises the transmission of a queue-status bit that will indicate whether the associated data packet is the last data packet in the queue. If not the last packet, then the remote station will assume the remote-specific queue is nonempty following the initial channel quality report request and cause the remote stations to continuously transmit channel quality reports for as long as data is queued. The queue status information may be associated with the data packet transmission via an associated control channel, or contained within the data packet or data packet header.

FIG. 5 is a flow chart showing operation of a remote station in accordance with the preferred embodiment of the present invention. The logic flow begins at step 501 where receiver 319 receives a channel quality request message. Based on the channel quality request message, control circuitry 311 determines the perceived channel quality from channel quality measurement circuitry 315 and prepares a channel quality report message (step 503). At step 505, the channel quality report message is transmitted via transmitter 317. In the first embodiment of the present invention, the control circuitry will repeat steps 503 and 505 until a packet is received successfully at step 507 after which an acknowledgement will be sent to base station at step 509.

In general, flow chart in FIG. 5 may be re-arranged to represent both the second and third embodiment of the present invention. To represent the second embodiment another decision must be added after the acknowledgement was sent in step 509. After sending the acknowledgment, the remote station must decide whether the base station remote-specific queue is empty. As mentioned above, this may be determined for by sending a last-packet indicator with the data transmission. If the remote-specific queue is not empty, the remote station will return to step 503 and continue to determine the channel quality and transmit channel quality report messages. If the remote-specific queue is empty, the logic flow ends.

When the remote-specific queue state information is transmitted independent of data as a separate control message, then steps 507 and 509 may also be omitted when describing the second embodiment of the present invention. To represent the third embodiment decision 507 and the sending of acknowledgments 509 must be removed from the flowchart since the transmission of channel quality reports is independent of whether a data transmission was successful. In addition, step 505 should be modified such that the remote station transmitted channel quality report messages for a predetermined number of times.

Figure 6:
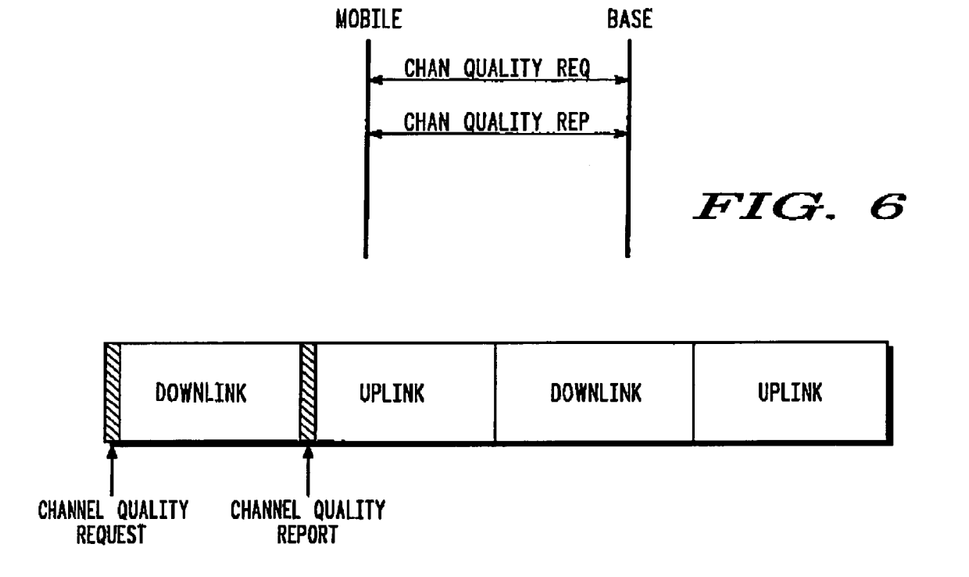
FIG. 6 shows a message sequence diagram for the transmission of a channel quality request message and reception of a channel quality report message.

FIG. 6 shows a message sequence diagram for the transmission of a channel quality request message and reception of a channel quality report message. As is illustrated, during the downlink frame, base station 101 inserts the channel quality request message into a downlink frame. In response, in a subsequent uplink frame, base station 101 receives a channel quality report, from which AMC parameters are chosen. Although FIG. 6 shows a TDD frame structure one of ordinary skill in the art will recognize that other duplexing methods (e.g., FDD) may be employed as well.

Figure 7:
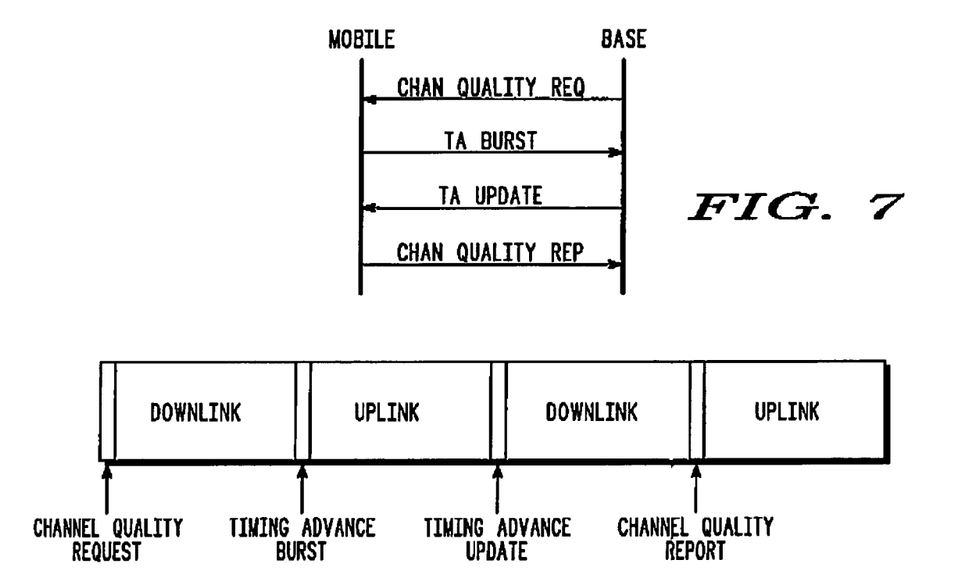
FIG. 7 illustrates timing advance as part of a channel quality request message.

As discussed above, timing advance may be part of the channel quality request message. The timing advance parameter indicates that the receiver should initiate a timing advance update procedure, advancing, or retarding its transmission by a predetermined period of time. This is illustrated in FIG. 7. As is evident, in response to the channel quality request message, the remote station will transmit a timing-advance burst. Timing advance bursts are well known in the art, and typically comprise a predetermined waveform known by the base station and remote station. In response, the base station will update its timing advance, and receive a channel quality update from the mobile.

Figure 8:
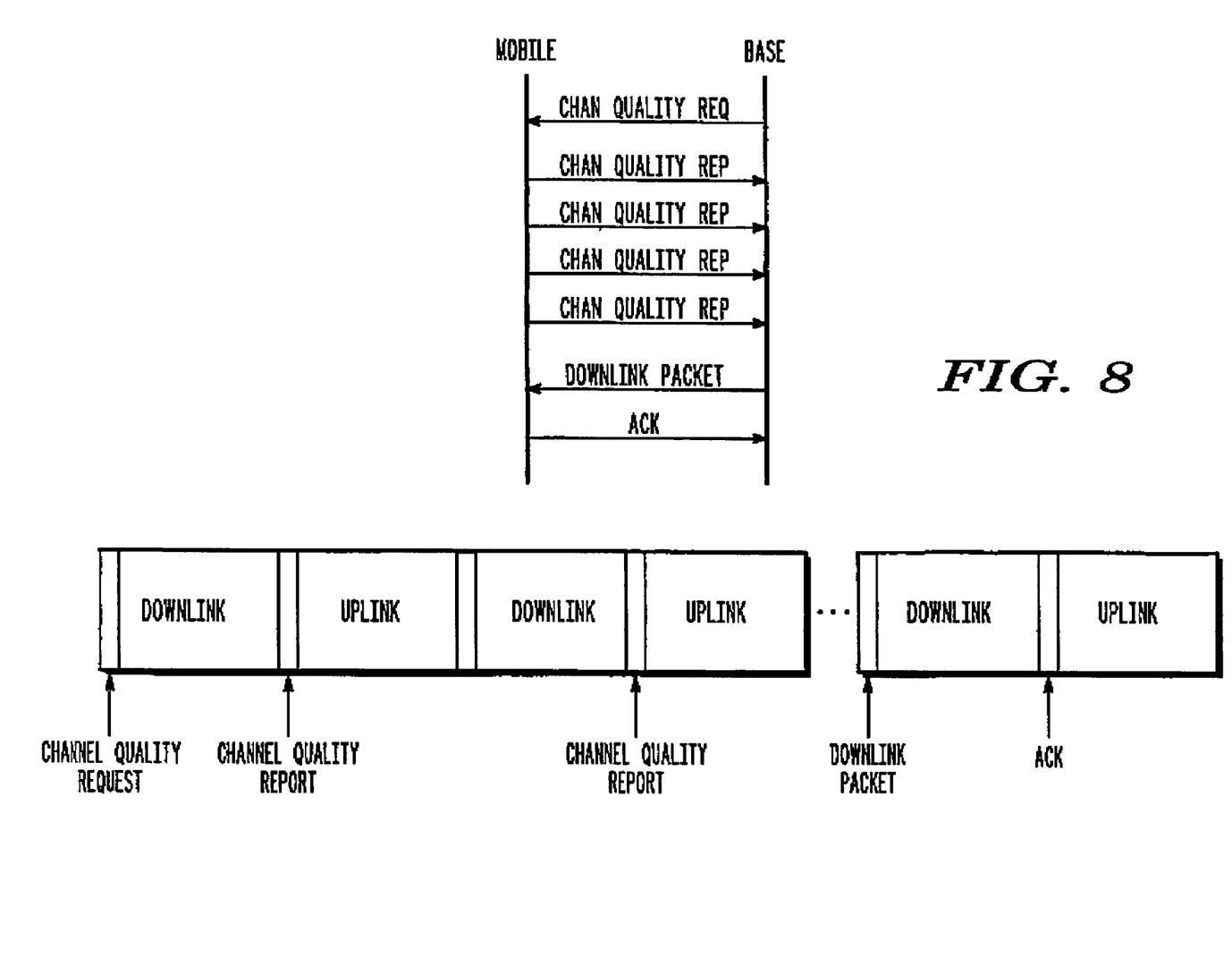
FIG. 8 illustrates the reception of several uplink channel quality report messages.

As mentioned above, several uplink channel quality report messages may be received in response to a single downlink channel quality request message. This is illustrated in FIG. 8. As shown, in response to the channel quality request message, the remote station will transmit several channel quality report messages. This is very useful when multiple receivers have data queued and the transmitter may not be able to schedule the transmission immediately (the transmitter could transmit to the receiver with the highest quality channel, for example). It also allows channel quality feedback to continue without requiring multiple feedback solicitations from the base.

Although FIG. 8 shows four channel quality report messages being transmitted in response to the channel quality request message, any number of report messages may be sent. For example, the receiver may send two channel quality report messages in response to a channel quality request message, or the receiver may send three channel quality report messages in response to a channel quality request message (in general, a small fixed number). The receiver may continue sending channel quality report messages until a transmission is successful or aborted in response to a channel quality request message. The receiver may continue sending channel quality report messages until a timer expires in response to a channel quality request message, where the timer may be pre-defined or the timer value may be set within the channel quality request message.

In the second embodiment, the receiver will continue to send channel quality report messages until the transmitter data queue is empty in response to a channel quality request message. In this case, the duration of the feedback is tied to the acknowledged delivery of an individual transmission (e.g., packet). Proposed 4G systems and 3G evolutions use a multi-channel stop-and-wait ARQ mechanism where each packet is individually acknowledged. As a result, a robust mechanism for terminating channel quality feedback exists. The transmitter can initiate channel quality feedback when a packet arrives and the receiver will automatically terminate it when the packet is delivered. The receiver may determine that the data queue is non-empty by the presence of additional transmissions directed to the receiver, looking for additional transmissions until a timer expires, where the timer value may be pre-defined or transmitted to the receiver. Alternatively, the receiver may determine that the data queue is non-empty by examining a non-empty indicator within a transmission control channel, or the receiver may determine that the data queue is non-empty by examining a non-empty indicator within a successfully decoded transmission. The receiver would only discontinue channel quality feedback when a transmission (e.g., packet) is delivered and the data queue is empty.

In a further embodiment, the system may use the channel quality report to explicitly define the modulation and coding level used in a wideband transmission such as OFDM enabling efficient communication of the AMC level assignments between the base station and remote station. In this embodiment, the channel quality report would be subdivided into several sub-bands and the remote station would uniquely report the channel quality for each of those sub-bands. For example, an OFDM system with 768 sub-carriers may define sub-band each of 16 sub-carrier widths for a total of 48 sub-bands. In this case, the channel quality report may contain a few bits (e.g. 4 bits) per sub-band. As a result, the channel quality report may be of a non-trivial size (e.g. 4×48=192 bits or 24 bytes). It is well known in the art, that a wide-band channel may have significant frequency selectivity such that the channel quality will have significant variation over all the sub-carrier bins. Therefore, each sub-carrier bin may require a different modulation and coding level making the AMC level assignment control message as large as a channel quality report. To obviate the need to explicitly transmit AMC level assignment message, the AMC levels in the data transmission from the base station to remote station transmissions may be based explicitly on the channel quality report sent from remote station to base station. Each channel quality report per sub-band may be algorithmically mapped to an AMC level used on the downlink transmission. Of course, this algorithmic mapping would be known apriori by both base station and remote station. More simply, the channel quality report may directly identify the modulation level. For example a value 00 could imply BPSK; a value of 01 could imply QPSK; a value of 10 could imply 16 QAM and a value of 11 could imply 64 QAM.

The above text describes a base station that maintains one remote-specific queue containing the data destined for each remote unit in the system. However, because of service guarantees, the base station may elect to transmit all packets of given priority level from all mobiles before transmitting the lower-priority packets. Therefore, each of these remote-specific queues may be further subdivided, either logically or physically, to categorize the packets destined for each particular remote unit. For example, the packets could be separated based on priority such as high and low. Alternatively, the packets could be separated based on service guarantees such as delay where voice packets would be kept in a separate sub-queue and unconstrained delay data packets would be kept in another sub-queue. In fact, the remote-specific queue may be subdivided into many sub-queues with each queue containing data packets associated with a particular application. The concept of queue empty may be applied to any one of these sub-queues such that the base station indicates the queue is empty when it has served all the data at a particular priority even though all the packets destined for the remote-unit have not been delivered. In this way, the base station may control channel quality feedback such that only the mobiles having packets of a given priority will be transmitting the channel quality feedback.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method comprising the step of transmitting a channel quality request message to a remote station wherein the channel quality request message specifies a predetermined number of future channel quality reports, wherein the channel quality request message is used to cause the remote station to transmit the predetermined number of channel quality reports indicating a perceived channel quality, and wherein the channel quality request message is used to cause the remote station to cease transmitting channel quality report messages after transmitting the predetermined number of channel quality reports and without a subsequent transmission of a stop message to the remote station.

2. The method of claim 1 further comprising the step of:
receiving the channel quality report; and
determining a modulation and coding scheme based on the channel quality report.

3. The method of claim 1 further comprising the step of:
transmitting a queue status to the remote station causing the remote station to continue transmitting channel quality reports.

4. The method of claim 3 wherein the remote station continues transmitting channel quality reports until the queue status indicates no further data is to be transmitted to the remote station.

5. The method of claim 3 wherein the step of transmitting the queue status comprises the step of transmitting a last packet indicator to the remote station.

6. An apparatus comprising:
control circuitry that conveys a channel quality request message via a transmitter to a remote station, wherein the channel quality request message specifies a predetermined number of future channel quality reports, wherein the channel quality request message is used to cause the remote station to transmit the predetermined number of channel quality reports indicating a perceived channel quality, and wherein the channel quality request message is used to cause the remote station to cease transmitting channel quality report messages after transmitting the predetermined number of channel quality reports and without a subsequent transmission of a stop message to the remote station; and
a transmitter that transmits the channel quality request message to the remote station in response to the control circuitry.

7. The apparatus of claim 6 further comprising:
a receiver that receives a channel quality report; and
adaptive modulation circuitry utilizing a modulation and coding scheme based on the channel quality report.

8. The apparatus of claim 6 further comprising:
a plurality of data queues;
logic circuitry determining remote units that have data queued within the plurality of data queues; and
wherein the transmitter further transmits the channel quality request message to the remote station in response to the logic circuitry determining that data is queued for the remote unit, the channel quality request message causing the remote station to transmit a channel quality report indicating a perceived channel quality.

9. The method of claim 1 further comprising:
determining if data is queued to be sent to a remote station; and
based on whether or not data is queued, transmitting the channel quality request message to the remote station.

10. The method of claim 1 wherein the indication of a persistence of transmission of channel quality reports comprises an indication of a period of time during which to send channel quality reports.

11. The method of claim 1 wherein the indication of a persistence of transmission of channel quality reports comprises a TIMEOUT parameter.

12. The method of claim 1 wherein the indication of a persistence of transmission of channel quality reports comprises an indication of a quantity of channel quality reports to be sent.

13. The method of claim 1 wherein the channel quality request message further comprises an identifier associated with the remote station.

14. The method of claim 1 wherein the channel quality request message further comprises an indication of uplink resources to be used for sending of the channel quality reports.

15. A method comprising the steps of:
receiving a channel quality request message from a base station, wherein the channel quality request message specifies a predetermined number of future channel quality reports;
in response to the channel quality request message, transmitting the predetermined number of channel quality report messages to the base station indicating a perceived channel quality; and
ceasing transmission of the channel quality report messages after transmitting the predetermined number of future channel quality reports and without receiving a stop message subsequent to receiving the channel quality request message.

16. The method of claim 15, wherein ceasing transmission comprises ceasing transmission of the channel quality report messages in response to expiration of a period of time indicated in the channel quality request message.

17. The method of claim 15, wherein ceasing transmission comprises ceasing transmission of the channel quality report messages in response to transmitting a quantity of channel quality report messages indicated in the channel quality request message.

18. The method of claim 1, wherein the channel quality request message indicates a reverse link resource to be used for a channel quality report.

19. The method of claim 1, wherein a format from among a plurality of formats is used to transmit each channel quality report and wherein the method further comprises the steps of:
blindly decoding received channel quality reports; and
for each blindly decoded channel quality report, determining a format used to transmit the channel quality report from among the plurality of formats.

20. The apparatus of claim 6, further comprising a receiver that receives a channel quality report and wherein the received channel quality report is of a preconfigured size and format.

21. The apparatus of claim 6, further comprising a receiver that receives a channel quality report and wherein the received channel quality report comprises a channel sounding waveform.

22. The apparatus of claim 6, further comprising a receiver that receives a channel quality report and wherein the received channel quality report comprises spatial channel information.

23. The apparatus of claim 6, further comprising a receiver that receives a channel quality report and wherein the received channel quality report comprises a spatial channel quality indicator specifying a condition number.

24. The apparatus of claim 6, further comprising a receiver that receives a channel quality report and wherein the received channel quality report comprises a received signal strength indicator.

25. The apparatus of claim 6, further comprising a receiver that receives a channel quality report and wherein the received channel quality report comprises a modulation and coding scheme index.

26. The apparatus of claim 6, wherein the apparatus is capable of operating in an Orthogonal Frequency Division Multiplexing system having a frequency bandwidth that comprises a plurality of sub-bands, wherein the apparatus further comprises a receiver that receives a channel quality report, and wherein the received channel quality report comprises a channel quality value for a subset of the plurality of sub-bands.

27. The apparatus of claim 6, wherein the channel quality request message indicates a reverse link resource to be used for a channel quality report.

28. The apparatus of claim 6, wherein a format from among a plurality of formats is used to transmit a channel quality report and wherein the apparatus further comprises:
a receiver that receives a channel quality report from a remote station;
means for blindly decoding the received channel quality report; and
means for determining a format used to transmit the blindly decoded channel quality report from among the plurality of formats.

29. The method of claim 15, wherein each channel quality report message is of a preconfigured size and format.

30. The method of claim 15, wherein each channel quality report message comprises one or more of a channel sounding waveform, spatial channel information, a spatial channel quality indicator specifying a condition number, a received signal strength indicator, and a modulation and coding scheme index.

31. The method of claim 15, wherein the method is employed in an Orthogonal Frequency Division Multiplexing system having a frequency bandwidth that comprises a plurality of sub-bands and wherein each channel quality report message comprises a channel quality value for a subset of the plurality of sub-bands.

32. The method of claim 15 further comprising the step of selecting a format from among a plurality of formats for transmission of the channel quality report messages.

* * * * *